US006332127B1

(12) United States Patent
Bandera et al.

(10) Patent No.: US 6,332,127 B1
(45) Date of Patent: Dec. 18, 2001

(54) SYSTEMS, METHODS AND COMPUTER PROGRAM PRODUCTS FOR PROVIDING TIME AND LOCATION SPECIFIC ADVERTISING VIA THE INTERNET

(75) Inventors: Daniel Quinto Bandera, Austin, TX (US); Mark F. Bregman, Ridgefield, CT (US); Ajei S. Gopal, Riverdale, NY (US); Sandeep Singhal, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/238,474

(22) Filed: Jan. 28, 1999

(51) Int. Cl.[7] ........................................... G06F 17/60
(52) U.S. Cl. ............................................ 705/14
(58) Field of Search .................. 705/1, 14, 50, 705/86; 709/218, 227

(56) References Cited

U.S. PATENT DOCUMENTS

| 5,127,674 | | 7/1992 | Lamphere et al. ............... 283/37 |
| 5,295,064 | | 3/1994 | Malec et al. ...................... 364/401 |
| 5,627,549 | | 5/1997 | Park .................................. 342/357 |
| 5,630,068 | | 5/1997 | Vela et al. ........................ 395/201 |
| 5,938,721 | * | 8/1999 | Dussell et al. ................... 701/211 |
| 5,948,040 | * | 9/1999 | DeLorme et al. ............... 701/201 |
| 6,047,327 | * | 4/2000 | Tso et al. ......................... 709/232 |
| 6,131,067 | * | 10/2000 | Girerd et al. .................... 701/213 |
| 6,133,853 | * | 10/2000 | Obradovich et al. ........... 340/905 |
| 6,148,261 | * | 11/2000 | Obradovich et al. ........... 701/208 |

FOREIGN PATENT DOCUMENTS

| 713317 | * | 5/1996 | (EP) | ................................. 705/14 |
| 9-231263 | * | 9/1997 | (JP) | ................................. 705/14 |
| 11-003072 | * | 1/1999 | (JP) | ................................. 705/14 |
| WO 99/60504 | * | 11/1999 | (WO) | .............................. 705/14 |

OTHER PUBLICATIONS

Wireless advertising is less advanced in the US than in Europe and Japan, but advertisers are eager to take advantage of US miltary;s lifting of GPS technology restrictions, Industry Standard, May 29, 2000, by Ben Hammer.*
Abstract, *Information Service Receiver, Information Service Providing Device and Information Services Provision System*, Japanese Patent Application No. JP09231263, filed Sep. 5, 1997.

* cited by examiner

*Primary Examiner*—Stephen Gravini
(74) *Attorney, Agent, or Firm*—Myers Bigel Sibley & Sajovec; A. Bruce Clay

(57) ABSTRACT

Systems, methods and computer program products are provided for selecting an advertising object to be displayed within a Web page requested by a user based on the geographic location of the user and/or on the time of day. Systems, methods and computer program products are provided for validating an offer within an advertising object of a Web page displayed within a Web client in communication with a Web server. Systems, methods and computer program products are also provided for changing content within an object displayed within a Web page based on changes in geographic location of a user. In addition, systems, methods and computer program products are provided for redeeming an electronic coupon stored within a first computing device, wherein the electronic coupon is valid within a designated geographic region and for a designated period of time.

39 Claims, 7 Drawing Sheets

SYSTEMS, METHODS AND COMPUTER PROGRAM PRODUCTS FOR PROVIDING TIME AND LOCATION SPECIFIC ADVERTISING VIA THE INTERNET

FIELD OF THE INVENTION

The present invention relates generally to advertising and, more particularly, to advertising over the Internet.

BACKGROUND OF THE INVENTION

The Internet is a worldwide decentralized network of computers having the ability to communicate with each other. The Internet has gained broad recognition as a viable medium for communicating and interacting across multiple networks. The World-Wide Web (Web) was created in the early 1990's and is comprised of server-hosting computers (Web servers) connected to the Internet that have hypertext documents or Web pages stored therewithin. Web pages are accessible by client programs (i.e., Web browsers) utilizing the Hypertext Transfer Protocol (HTTP) via a Transmission Control Protocol/Internet Protocol (TCP/IP) connection between a client-hosting device and a server-hosting device. While HTTP and hypertext documents are the prevalent forms for the Web, the Web itself refers to a wide range of protocols including Secure Hypertext Transfer Protocol (HTTPS), File Transfer Protocol (FTP), and Gopher, and content formats including plain text, Extensible Markup Language (XML), as well as image formats such as Graphics Interchange Format (GIF) and Joint Photographic Experts Group (JPEG).

Specific to the Web, a Web server is a computer program (housed in a computer) that serves requested Web pages and files. A Web client is a requesting program associated with a user. A Web browser is an exemplary Web client for use in requesting Web pages and files from Web servers.

A Web site is conventionally a collection of Web pages and files related to a particular subject that includes a beginning file called a home page. A large Web site may reside on a number of geographically-dispersed Web servers. The Web site of the International Business Machines Corporation (www.ibm.com), for example, consists of thousands of Web pages and files spread out over various Web servers in locations world-wide.

As is known to those skilled in this art, a Web page is conventionally formatted via a standard page description language such as HyperText Markup Language (HTML), which typically contains text, and can reference graphics, sound, animation, and video data. HTML provides for basic document formatting and allows a Web content provider to specify anchors or hypertext links (typically manifested as highlighted text) to other Web servers and files. When a user selects a particular hypertext link, a Web browser reads and interprets an address, called a Uniform Resource Locator (URL) associated with the link, connects the Web browser with a Web server at that address, and makes an HTTP request for the file identified in the link. The Web server then sends the requested file to the Web client which the Web browser interprets and displays to the user.

Exemplary Web browsers include Netscape Navigator® (Netscape Communications Corporation, Mountain View, CA) and Internet Explorer® (Microsoft Corporation, Redmond, WA). Web browsers typically provide a graphical user interface for retrieving and viewing information, applications, and other resources hosted by Web servers.

As the Web has evolved into a viable commercial medium, advertising has become an important source of revenue for many commercial Web sites. Web pages served from commercial Web sites often utilize advertising to promote various goods and services. FIG. 1 illustrates an exemplary Web page 10 containing various content objects 11, including a "banner" advertising object 12. To be effective, Web advertising is preferably targeted to the types of users likely to request a particular Web page in which the advertising is provided. In addition, advertising may be placed within a requested Web page based upon the identity of a user requesting the Web page.

With the increasing mobility of today's society, the demand for mobile computing capabilities has also increased. Many workers and professionals are downsizing their laptop computers to smaller palm-top or hand-held devices, such as personal digital assistants (PDAs). In addition, many people now utilize computing devices, such as cellular telephones, within their automobiles to access the Internet and to perform various other computing functions. Hand-held computing devices including, but not limited to, PDAs and cellular telephones are often collectively referred to as "pervasive" computing devices. Many hand-held computing devices utilize the Microsoft® Windows CE and 3Com Palm Computing® platforms.

Accordingly, there is a need to enhance the efficacy of advertising to users accessing the Web via mobile Web clients.

SUMMARY OF THE INVENTION

In view of the above discussion, it is an object of the present invention to enhance the efficacy of advertising via the Web.

It is another object of the present invention to enhance the efficacy of advertising to users accessing the Web via mobile Web clients.

According to one aspect of the present invention, these and other objects are provided by systems, methods and computer program products for selecting an advertising object to be displayed within a Web page requested by a user based on the geographic location of the user and/or on the time of day. A user makes a Web page request via a mobile Web client in communication with a Web server. The mobile Web client, in response to the user request, obtains user location information, for example from a Global Positioning System (GPS), and transmits the user request for the Web page to the Web server with the obtained user location information. The Web server selects an advertising object based upon the user's location and/or the time of day the Web page request is received. The Web server generates the requested Web page with the selected advertising object included therein and serves the generated Web page to the mobile Web client. Advertising objects can include text files, audio files, video files, image files, hyperlinks, and the like.

According to another aspect of the present invention, systems, methods and computer program products are provided for validating an offer within a Web page advertising object displayed within a Web client in communication with a Web server. An advertising object contains a validation anchor that references a remotely located validation program. Furthermore, the validation anchor is associated with an indication of time. In response to user selection of the validation anchor for the purpose of validating the offer within the advertising object, the Web client retrieves user location information, for example from a GPS. The Web client then transmits the validation request to the Web server with the retrieved user location information and/or with time of day information. The Web server determines the validity of the offer based on the received user location information and/or the received time of day information. The Web server then communicates the validity of the offer to the user.

According to another aspect of the present invention, systems, methods and computer program products are provided for changing content within a Web page object based on changes in geographic location of a user. The Web page object is configured to monitor a user's location via a GPS. In response to determining that a user has changed geographic locations, the content within the object can be changed. In addition, content within the Web page object can be changed in response to changes in time of day.

Web page objects according to this aspect of the present invention are preferably JAVA® applets that are configured to communicate directly with a GPS or other user location identification systems. Content changes can be obtained remotely from a Web server or locally from a mobile Web client.

According to another aspect of the present invention, systems, methods and computer program products are provided for redeeming an electronic coupon stored within a first computing device, wherein the electronic coupon is valid within a designated geographic region and for a designated period of time. A first computing device, such as a mobile Web client, receives an electronic coupon from a Web server. The electronic coupon has an identifier associated therewith. A user takes the mobile Web client and establishes a communications link between the mobile Web client and a second computing device, such as a point-of-sale terminal at a commercial enterprise. The second computing device verifies that the mobile Web client is located within the designated geographic region and that the designated period of time for redeeming the coupon has not expired. In addition, the second computing device verifies that an electronic coupon with the same identifier has not been previously redeemed.

The various aspects of the present invention are advantageous because advertising effectiveness over the Internet can be enhanced in various ways. As the use of mobile computing devices increases, advertisers can more effectively target users on the basis of location and time of day.

BRIEF DESCRIPTION OF THE DRAWINGS

FIG. 5 illustrates operations for validating an offer within an advertising object displayed within a Web page according to an embodiment of the present invention.

FIG. 7 illustrates operations for changing content within an object displayed within a Web page based on changes in user location and time of day according to another embodiment of the present invention.

DETAILED DESCRIPTION OF THE INVENTION

The present invention now is described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

As will be appreciated by one of skill in the art, the present invention may be embodied as a method, data processing system, or computer program product. Accordingly, the present invention may take the form of an entirely hardware embodiment, an entirely software embodiment, or an embodiment combining software and hardware aspects. Furthermore, the present invention may take the form of a computer program product on a computer-usable storage medium having computer-usable program code means embodied in the medium. Any suitable computer readable medium may be utilized including hard disks, CD-ROMs, optical storage devices, or magnetic storage devices.

Figure 1:
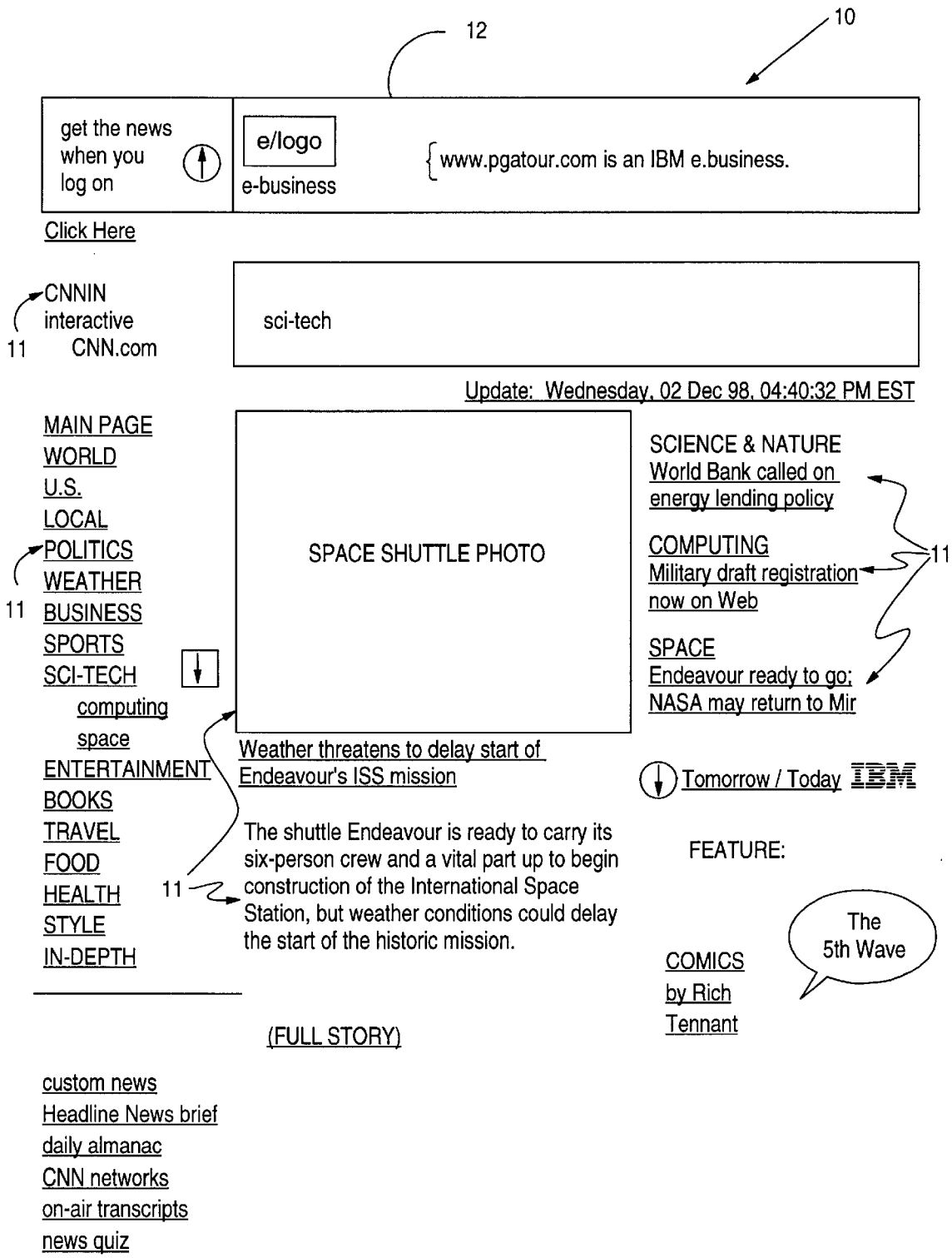
FIG. 1 illustrates an exemplary Web page containing various content objects and advertising objects.
Figure 2:
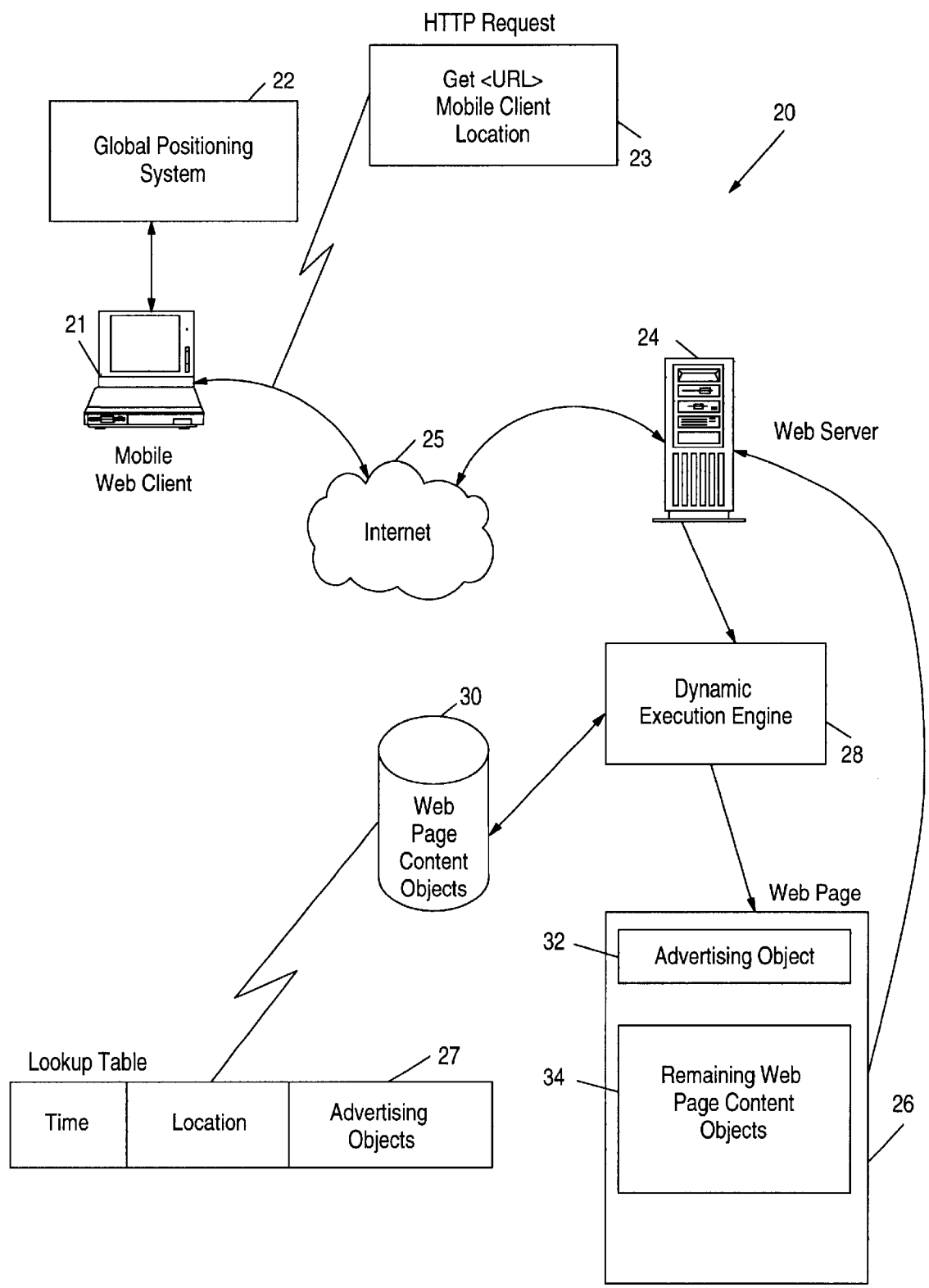
FIG. 2 illustrates a system within which time and location-specific Web advertising may be implemented, according to an embodiment of the present invention.

Referring now to FIG. 2, a system 20 within which the present invention may be implemented is schematically illustrated. A mobile Web client 21 is in communication with a Web server 24 via a computer network, such as the Internet 25. Throughout the following description, it shall be understood that in certain circumstances, a Web server may be implemented as a process that, in fact, is co-located on a mobile Web client. These so-called micro-servers or embedded Web servers typically require a smaller footprint than traditional Web servers.

The mobile Web client 21 is configured to obtain location information from a Global Positioning System (GPS) 22. As will be described in detail below, location information for the mobile Web client 21 (and, thus for a user) can be included within a Web page request 23 such that advertising objects (as well as other content objects) can be selected for inclusion within the Web page based on the location of the mobile Web client 21. It will be understood that location information also may be obtained based upon an identification of a cellular base station or a satellite beam that is in communication with the mobile Web client 21. Although identification of a cellular base station or satellite beam may not provide as precise a location as a GPS, the location may be sufficiently precise to allow selection of advertising objects according to the present invention.

The Web server 24 is configured to dynamically generate a requested Web page 26 using a dynamic execution engine (DEE) 28 and one or more Web page content objects. The DEE 28 defines the selection of content objects within the Web page and the layout of those content objects within the Web page 26 when displayed within a Web client (i.e., Web browser). Conventionally, each element of a Web page, including, but not limited to, divisions, sections, headings, paragraphs, images, lists, tables, and hyperlinks, may be represented by a content object. In addition, a content object may include audio and video files. It is understood, however, that a single content object may represent one or more of these Web page elements. Dynamic generation of Web pages is well understood by those skilled in the art and need not be described further herein.

In the illustrated embodiment, content objects, such as advertising objects, are stored within a database 30 that is accessible by the DEE 28. However, it is to be understood that content objects can be stored in a file system, as well. When a user request is received for a Web page 26, the DEE 28 generates the Web page 26 using objects stored within the database 30.

An advertising object 32 is contained within the generated Web page 26, as illustrated. According to an embodiment of the present invention, a lookup table 27 is utilized to associate time of day and user locations with a plurality of respective advertising objects stored within the database 30. Accordingly, as will be described below, an advertising object can be selected for display within a requested Web page based on a user location and/or on the time of day. Exemplary advertising objects may include text files, audio files, video files, image files, and the like.

Computer program code for carrying out operations of the present invention is preferably written in an object oriented programming language such as JAVA®, Smalltalk, or C++. However, the computer program code for carrying out operations of the present invention may also be written in conventional procedural programming languages, such as the "C" programming language, in an interpreted scripting language, such as Perl, or in a functional (or fourth generation) programming language such as Lisp, SML, or Forth.

A particularly preferred programming language for implementing aspects of the present invention is JAVA®. JAVA® is an object-oriented programming language developed by Sun Microsystems, Mountain View, California. JAVA® is a portable and architecturally neutral language. JAVA® source code is compiled into a machine-independent format that can be run on any machine with a JAVA® runtime system known as the JAVA® Virtual Machine (JVM). The JVM is defined as a virtual machine that is implemented by emulating a processor through the use of software on a real machine. Accordingly machines running under diverse operating systems, including UNIX, Windows NT, and MacIntosh having a JVM can execute the same JAVA® program.

Web browsers including Netscape Navigator® and Microsoft Internet Explorer® are referred to as JAVA®-enabled browsers because they include a version of the JVM. JAVA® applets are programs written in JAVA® and configured to run within JAVA®-enabled browsers. Handled in a manner similar to the way images are handled, JAVA® applets are displayed as part of a HyperText MarkUp Language (HTML) document. When a JAVA® applet is loaded, it can present special effects, such as animation, graphics, and sound; perform real-time data updates and applications; and interact with a user through a mouse, keyboard and various interface elements such as buttons, slides and text fields.

As is known to those skilled in this art, JAVA® source code is compiled into bytecode using a JAVA® compiler, such as the one referred to as javac. Compiled JAVA® programs are saved in files with the extension "class". When a JAVA®-enabled Web browser recognizes that an applet has been requested, a JAVA® interpreter program runs the JAVA® applet bytecode on the JVM.

The program code for implementing the present invention may execute entirely on a Web server, or it may execute partly on a Web server and partly on a remote computer (i.e., a user's mobile Web client). In the latter scenario, the remote computer may be connected to the Web server through a LAN or a WAN, or the connection may be made to an external computer (for example, through the Internet using an Internet Service Provider).

The present invention is described below with reference to flowchart illustrations of methods, apparatus (systems), and computer program products according to an embodiment of the invention. It will be understood that each block of the flowchart illustrations, and combinations of blocks in the flowchart illustrations, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the flowchart block or blocks.

Time-Based and Location-Based Advertising Generation

Figure 3:
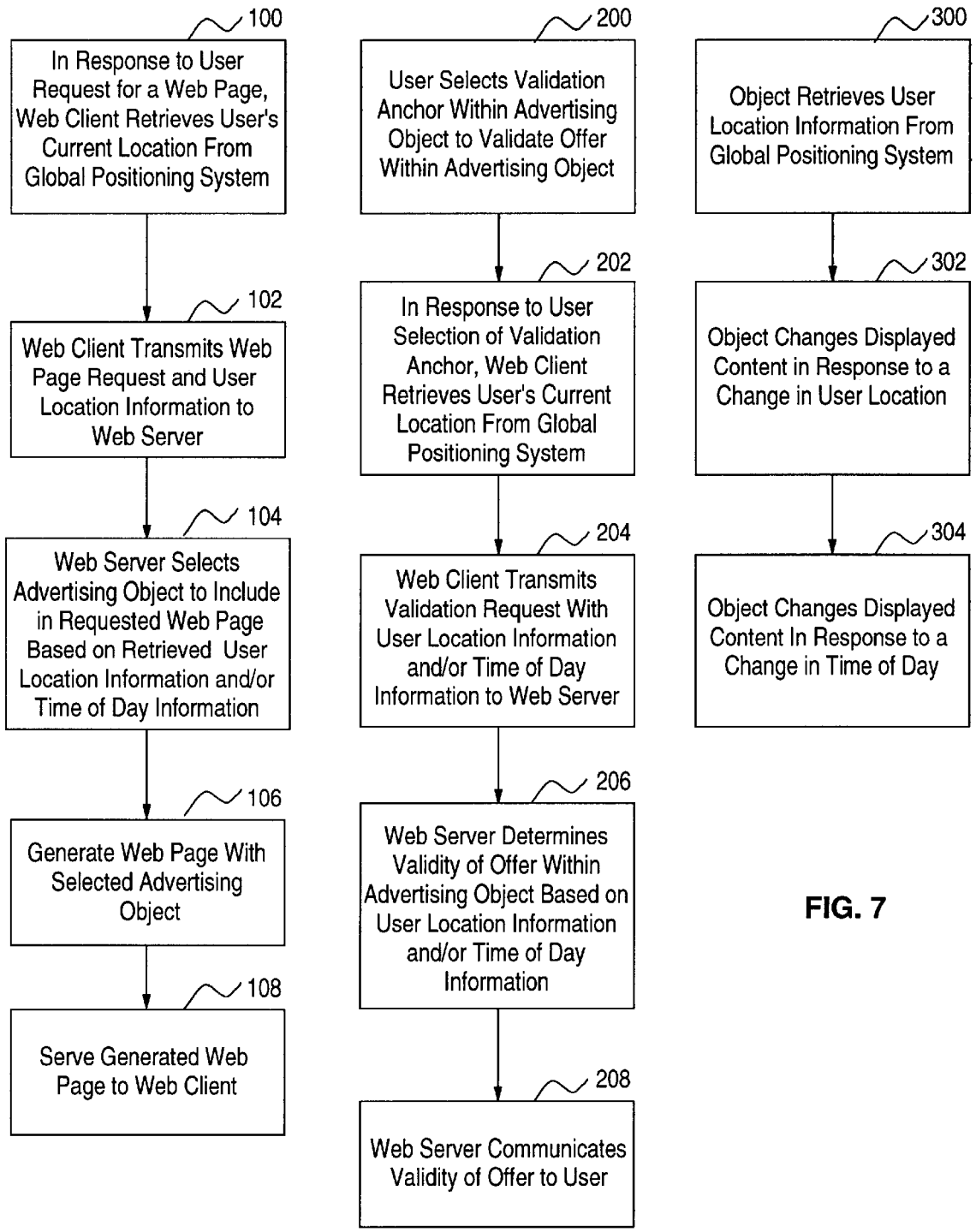
FIG. 3 illustrates operations for selecting an advertising object to be displayed within a Web page requested by a user according to an embodiment of the present invention.

Referring now to FIG. 3, operations for selecting an advertising object to be displayed within a Web page requested by a user according to the present invention are illustrated. In response to a user's request for a Web page via a mobile Web client in communication with a Web server, the mobile Web client retrieves information about the user's current location (Block 100). User location information may be obtained via a GPS (22, FIG. 2) in communication with the mobile Web client (21, FIG. 2). A GPS is a constellation of spaced-apart satellites that orbit the Earth and make it possible for people with ground receivers to pinpoint their geographic location. A GPS is well understood by those skilled in the art and need not be described further herein.

GPS communications may be integrated with a Web browser of a mobile Web client. Alternatively, user requests made via a Web client may be intercepted by a Web client operating system which is configured to fetch user location information via a GPS. Furthermore, it is understood that the present invention is not limited to the use of a GPS for retrieving user location information. For mobile Web clients accessing a Web server via a telephone system, a Web server may trace the calling telephone number to determine the local exchange within which the mobile Web client is presently located. The local exchange could then be used to broadly determine the current location of the user.

Alternatively, location information may be obtained based upon an identification of a cellular base station or a satellite beam that is in communication with the mobile Web client (21, FIG. 2). Although identification of a cellular base station or satellite beam may not provide as precise a location as a GPS, the location may be sufficiently precise to allow selection of advertising objects according to the present invention.

The Web client then transmits the retrieved user location information with the Web page request to the Web server (Block 102). Note that in cases described above where the server queries the telephone exchange or where the location is determined by the cellular base station, this information is not actually transmitted by the client within the request. The user location information may be conveyed to the Web server in an HTTP header as part of the Web page request (23, FIG. 2). The Web server then selects an advertising object (or objects) to include in the requested Web page based on the retrieved user location information (Block 104). Additionally, the Web server may select an advertising object(s) based on the time of day the user request was received, alone or in combination with the retrieved user location information. Preferably, a dynamic execution engine (28, FIG. 2) searches a lookup table (27, FIG. 2) that contains a plurality of advertising objects each having location and time of day information associated therewith.

The Web server generates the requested Web page with the selected advertising object(s) included therewithin (Block 106). The generated Web page is then served to the mobile Web client (Block 108).

As an example of this aspect of the present invention, a user requests a Web page from a Web server via a mobile Web client. The Web server utilizes user location information transmitted with the Web page request to select an advertisement object that presents information about something that is physically near the user's present location. For example, information relating to the nearest store in a national chain of stores can be presented within an advertising object displayed within a Web page.

As another example of this aspect of the present invention, an advertisement object(s) can be selected based on the time of day a user request is received by a Web server. For example, an advertisement object related to bagels may be selected and displayed within a requested Web page when the Web page request is received between the hours of 6:00 o'clock in the morning and 9:00 o'clock in the morning. By contrast, an advertisement object related to a tavern's "happy hour" may be selected and displayed within the requested Web page when a user request is received between the hours of 6:00 o'clock in the evening and 8:00 o'clock in the evening.

Time-Based and Location-Based Advertising Response Processing

According to another aspect of the present invention, an advertising object within a Web page may contain an offer that is valid only for a limited time or only within a particular geographic region. The advertising object may contain a hypertext link referred to as a "validation anchor" that references a remotely located validation program. The validation anchor may also be associated with an indication of the time of day. As is known to those skilled in the art of HTML, a validation anchor can establish text, images, or other information objects as being either the target of a hypertext link within a document or a reference to such a target.

Figure 4:
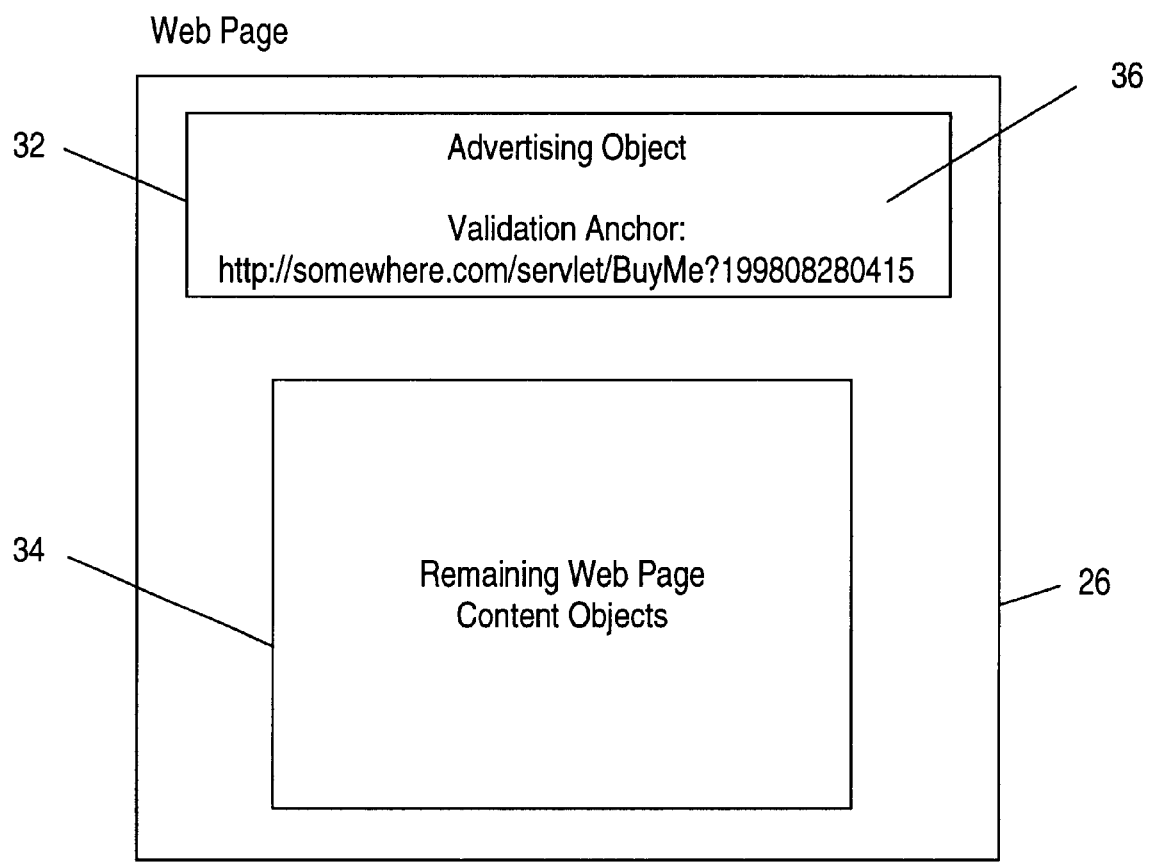
FIG. 4 illustrates an exemplary Web page that contains an advertising object with a validation anchor according to an embodiment of the present invention.

FIG. 4 illustrates an exemplary Web page 26 that contains an advertising object 32 with a validation anchor 36 according to the present invention. Preferably, the validation anchor 36 is encoded to include an expiration time and/or a valid location for an offer contained within the advertising object 32. Alternatively, the validation anchor 36 may be encoded with an index that can be converted into an indication of time of day and/or an indication of location by a Web server, typically by accessing a table stored therewithin.

Referring now to FIG. 5, operations for validating an offer within an advertising object displayed within a Web page on a mobile Web client, according to the present invention, are illustrated. The displayed Web page contains an advertising object having a validation anchor as described above. A user selects the validation anchor to validate an offer made within the advertising object (Block 200). In response to the user's selection of the validation anchor, the mobile Web client retrieves information about the user's current location (Block 202). User location information may be obtained via a GPS in communication with the mobile Web client. However, as discussed above, the present invention is not limited to the use of a GPS for retrieving user location information.

In the preferred embodiment, the mobile Web client transmits the user's validation request, preferably as an HTTP request, with the retrieved user location information to a Web server (Block 204). The Web server determines the validity of the offer based upon the received user location and/or information about the time of day that the request is received, in conjunction with validity location/time information encoded either in the requested URL or through a table lookup based on an index encoded in the requested URL (Block 206). The Web server then communicates whether or not the offer is still valid to the user (Block 208).

As an example of this aspect of the present invention, an advertising object for a particular commercial enterprise displayed within a Web page may contain an offer that reads: "If you buy product "X" within the next ten minutes, there will be a 10% discount." When the Web server receives the user's validation request, time of day information encoded within the validation anchor can be decoded to determine whether the user has made the request within the ten minute window.

If user location information is transmitted with the user's validation request, the Web server can determine if the user is in the vicinity of a store of the commercial enterprise. If the user is in the vicinity of a store, an offer of an additional 10% discount may be made to the user under the condition that the user visit and purchase product "X" from the store.

Active Advertisements Based on Location and Time

According to another aspect of the present invention, Web page content objects can expire and can be "refreshed" based on both the time of day and the location of a user. For example, when a user requests a particular Web page from a particular location during a particular time of day, an advertising object associated with the user's location and the time of day of the Web page request may be included within the requested Web page.

Figure 6:
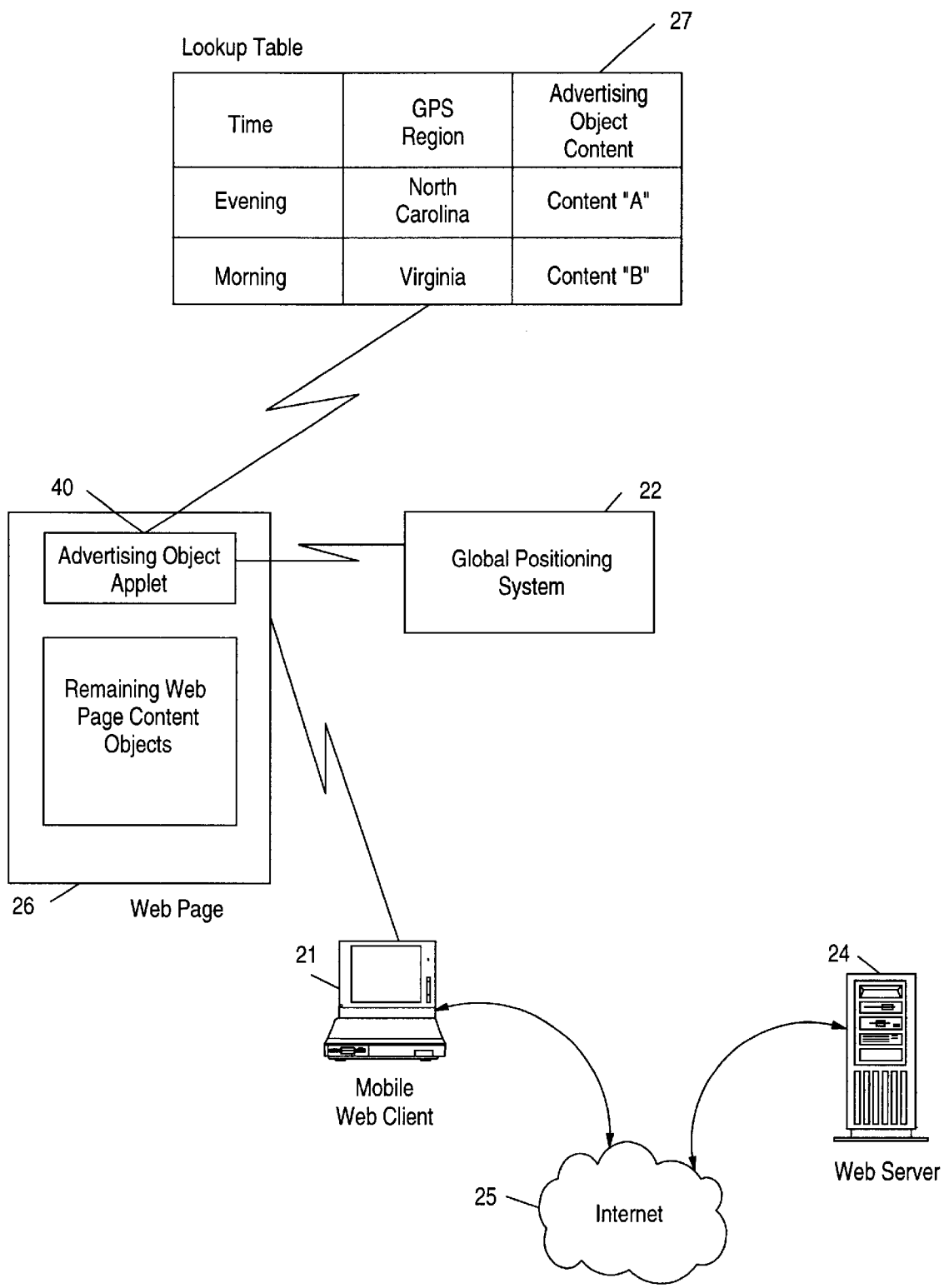
FIG. 6 illustrates a JAVA® applet configured to change content based on user location, and wherein the JAVA® applet is configured to communicate with a GPS so as to determine when the user moves with the mobile Web client from one GPS region to another.

Referring to FIG. 6 a JAVA® applet 40 running within a mobile Web client 21 is configured to communicate with a GPS 22 so as to determine when the user moves with the mobile Web client from one GPS region to another. When the JAVA® applet 40 determines that the Web client has moved to another GPS region, an HTTP request is made to a Web server 24 to refresh the applet display.

Alternatively, the JAVA® applet 40 may contain a plurality of advertising objects within a lookup table 27, wherein each advertising object is associated with a GPS region and/or time of day. When the user moves with the mobile Web client 21 out of a region associated with a particular advertising object, the JAVA® applet 40 replaces the displayed advertising object with a different advertising object. Similarly, if a window of time within which a particular advertising object is to be displayed expires, the JAVA® applet 40 replaces the displayed advertising object with a different advertising object.

As illustrated in FIG. 6, an advertising object with content "A" is displayed if the user is within the GPS region "North Carolina" and the time of day is the evening. Content "B" is displayed within the advertising object if the user is within the GPS region "Virginia" and the time of day is the morning.

Referring now to FIG. 7, operations for changing content within an object displayed within a Web page based on changes in user location and time of day, according to the present invention, are schematically illustrated. An object is configured to retrieve user location information from a GPS (Block 300). The object can change its displayed content in response to changes in user location (Block 302). In addition, the object can change its displayed content in response to changes in time of day (Block 304).

For example, a Web page displayed within a mobile Web client includes an advertising object with content related to one of a national chain of restaurants nearest to the user. As the user moves, the JAVA® applet (40, FIG. 6) monitors the user's location. When the user moves out of a particular GPS region associated with the displayed advertising object, the JAVA® applet refreshes itself to reflect the restaurant in the national chain that is now within the user's present GPS region. The JAVA® applet may be refreshed either by making an HTTP request to a Web server or by loading a new advertising object into the displayed Web page from local cache included within the JAVA® applet within the Web client.

It is understood that the present invention is not limited to advertising objects. Various types of content objects can be displayed and changed based on a user's location and/or time of day, in accordance with the present invention.

Portable Electronic Coupons

Figure 8:
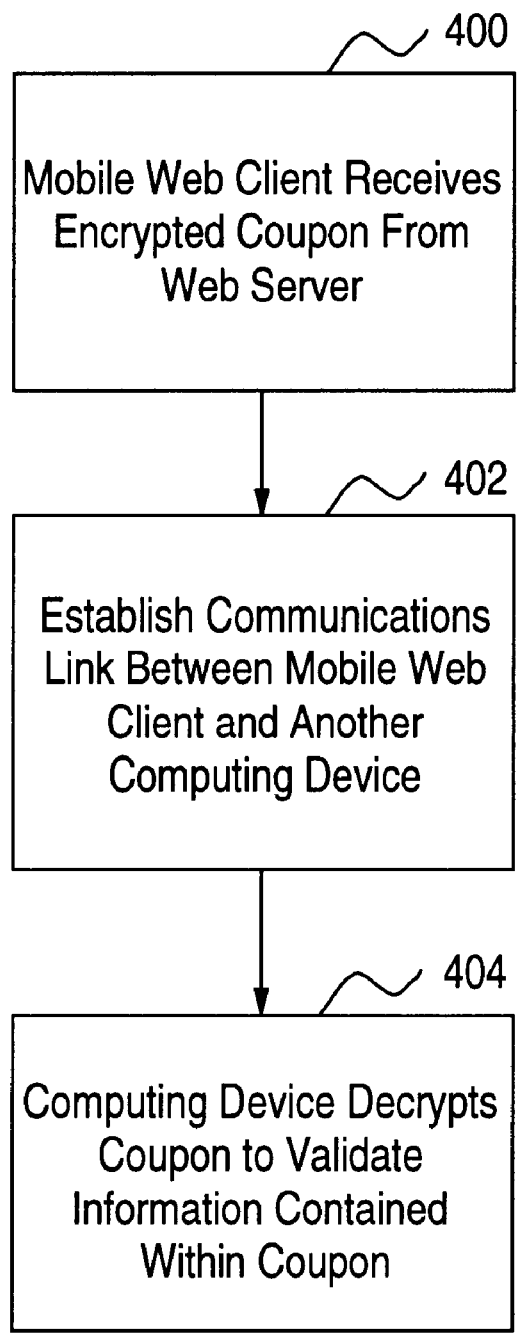
FIG. 8 illustrates operations for obtaining and using electronic coupons according to an embodiment of the present invention.

According to another aspect of the present invention, coupons that are valid only for particular times and within particular locations, can be stored within a mobile Web client and redeemed by establishing communications between a mobile Web client and various electronic devices. Referring to FIG. 8, operations whereupon a Web client can obtain and use electronic coupons, according to an embodiment of the present invention, are illustrated. A mobile Web client receives an encrypted coupon from a Web server and stores the coupon locally within the mobile Web client, preferably setting access rights to prevent the user from manually or programmatically modifying the contents of the coupon (Block 400). The stored coupon preferably includes an expiration time, as well as a serial number or other identifier. The coupon may also include location information regarding the geographic locations wherein the coupon is valid.

A user can then take the mobile Web client to an appropriate business establishment to redeem the stored coupon. The user preferably establishes communications between the mobile Web client and another computing device, such as a cash register (Block 402). This communication may be established over a wireline connection, such as a serial cable, or using wireless technology such as infrared transmission, packet radio, or the forthcoming Bluetooth radio standard. Preferably, over this communication session, selected data, including the electronic coupon, stored on the mobile Web client is transmitted to the computing device. The computing device decrypts the encrypted coupon to validate location information and time of day information contained within the coupon (Block 404). Encryption and decryption are well understood by those skilled in the art and need not be described further herein.

Preferably, a network registry of coupon serial numbers is utilized to reduce the risk of a coupon being used more than once. Once validated by the computing device of the commercial establishment, the coupon can be redeemed by the user, and the network registry is updated to reflect the coupon's use.

Figure 9A:
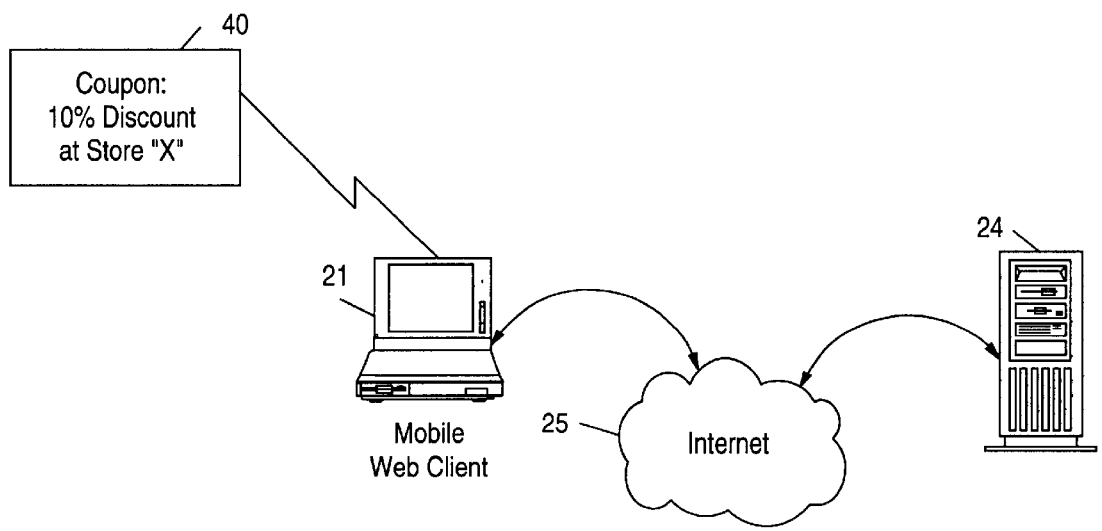
FIG. 9A illustrates a mobile Web client receiving an electronic coupon from a Web server.
Figure 9B:
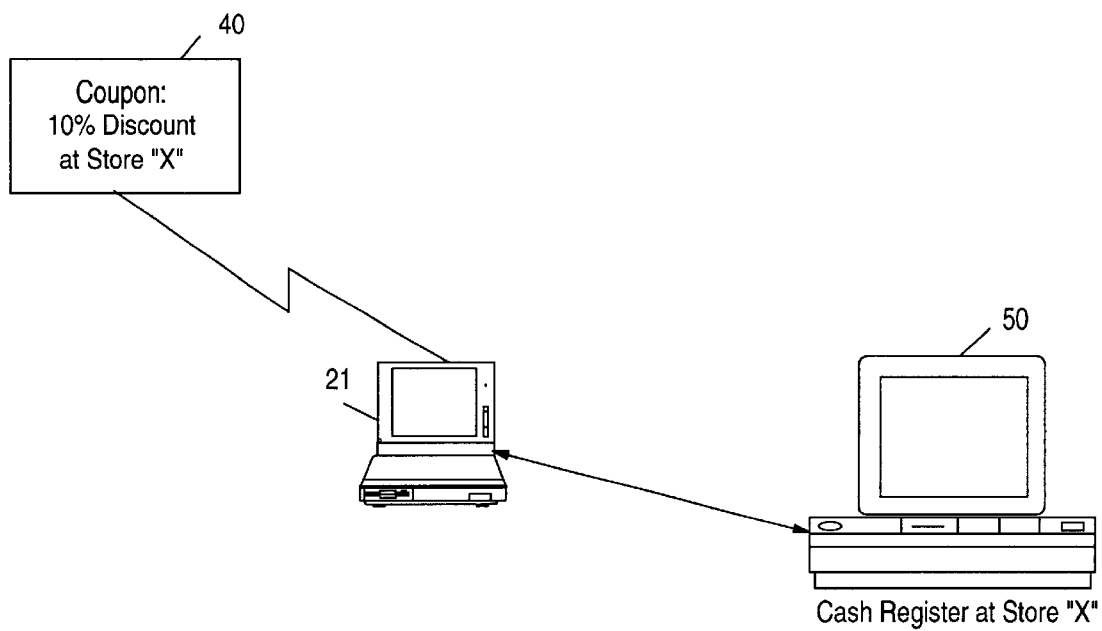
FIG. 9B illustrates the mobile Web client of FIG. 9A in communication with a computing device, such as a cash register, to redeem an electronic coupon.

FIG. 9A illustrates a mobile Web client 21 receiving a coupon 40 from a Web server 24. The illustrated coupon 40 is redeemable for 10% off of the price of goods at store "X." The coupon 40 preferably includes encrypted information such as a serial number, expiration information, and location information. In FIG. 9B, a communications link, such as an infrared communications link, has been established between the mobile Web client 21 and a computing device 50, such as a cash register, at store "X." The computing device is configured to decrypt the coupon and check the validity of the coupon.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims In the claims, means-plus-function clause are intended to cover the structures described herein as performing the recited function and not only structural equivalents but also equivalent structures. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims. The invention is defined by the following claims, with equivalents of the claims to be included therein.

That which is claimed is:

1. A method of selecting an object to be displayed within a Web page requested by a user from a Web server, wherein the user makes the Web page request via a mobile Web client in communication with the Web server, the method comprising the following steps:

obtaining user location information in response to a user request for a Web page to be displayed via a mobile Web client, wherein the user location information is obtained by the mobile Web client;

transmitting the user request for the Web page to the Web server, wherein the Web page request contains the user location information;

receiving the user request for the Web page at the Web server, along with the obtained user location information that is contained within the Web page request;

selecting an object to include within the requested Web page based on the obtained user location information contained within the Web page request;

generating the requested Web page, wherein the generated Web page includes the selected object; and serving the generated Web page to the mobile Web client.

2. A method according to claim 1 wherein the step of obtaining user location information comprises obtaining user location information from a Global Positioning System (GPS) in communication with the mobile Web client.

3. A method according to claim 1 wherein the step of obtaining user location information comprises obtaining user location information from a telephone number associated with the mobile Web client.

4. A method according to claim 1 further comprising the step of selecting an object to include within the requested Web page based on a time of day that the Web page request is received by the Web server.

5. A method according to claim 1 wherein the step of transmitting the user request for the Web page to the Web server comprises transmitting the obtained user location information to the Web server in a HyperText Transfer Protocol (HTTP) header.

6. A method according to claim 1 wherein the step of selecting an object to include within the requested Web page comprises selecting an object from a plurality of objects wherein each respective object has user location information associated therewith.

7. A method according to claim 4 wherein the step of selecting an object to include within the requested Web page comprises selecting an object from a plurality of objects wherein each respective object has time of day information associated therewith.

8. A method according to claim 1 further comprising the step of validating content within the displayed object based on time of day.

9. A method according to claim 1:
wherein the step of selecting an object comprises selecting, from a plurality of objects having respective location and time of day information associated therewith, an object having location and time of day information matching the obtained user location information and time of day that the Web page request is received by the Web server.

10. A method according to claim 9 wherein the step of obtaining user location information comprises obtaining user location information from a GPS in communication with the mobile Web client.

11. A method according to claim 9 wherein the step of obtaining user location information comprises obtaining user location information from a telephone number associated with the mobile Web client.

12. A method according to claim 9 wherein the step of transmitting the user request for the Web page to the Web server comprises transmitting the obtained user location information to the Web server in a HyperText Transfer Protocol (HTTP) header.

13. A method according to claim 9 further comprising the step of validating content within the displayed object based on time of day.

14. A system for selecting an object to be displayed within a Web page requested by a user from a Web server, wherein the user makes the Web page request via a mobile Web client in communication with the Web server, comprising:
means for obtaining user location information in response to a user request for a Web page to be displayed via a mobile Web client, wherein the user location information is obtained by the mobile Web client;

means for transmitting the user request for the Web page to the Web server, wherein the Web page request contains the user location information;

means for receiving the user request for the Web page at the Web server along with the obtained user location information that is contained within the Web page request;

means for selecting an object to include within the requested Web page based on the obtained user location information contained within the Web page request;

means for generating the requested Web page, wherein the generated Web page includes the selected object; and means for serving the generated Web page to the mobile Web client.

15. A system according to claim 14 wherein the means for obtaining user location information comprises means for obtaining user location information from a Global Positioning System (GPS) in communication with the mobile Web client.

16. A system according to claim 14 wherein the means for obtaining user location information comprises means for obtaining user location information from a telephone number associated with the mobile Web client.

17. A system according to claim 14 further comprising means for selecting an object to include within the requested Web page based on a time of day that the Web page request is received by the Web server.

18. A system according to claim 14 wherein the means for transmitting the user request for the Web page to the Web server comprises means for transmitting the obtained user location information to the Web server in a HyperText Transfer Protocol (HTTP) header.

19. A system according to claim 14 wherein the means for selecting an object to include within the requested Web page comprises means for selecting an object from a plurality of objects wherein each respective object has user location information associated therewith.

20. A system according to claim 17 wherein the means for selecting an object to include within the requested Web page comprises means for selecting an object from a plurality of objects wherein each respective object has time of day information associated therewith.

21. A system according to claim 14 further comprising means for validating content within the displayed object based on time of day.

22. A system according to claim 14,
wherein the means for selecting an object comprises means for selecting, from a plurality of objects having respective location and time of day information associated therewith, an object having location and time of day information matching the obtained user location information and time of day that the Web page request is received by the Web server.

23. A system according to claim 22 wherein the means for obtaining user location information comprises means for obtaining user location information from a GPS in communication with the mobile Web client.

24. A system according to claim 22 wherein the means for obtaining user location information comprises means for obtaining user location information from a telephone number associated with the mobile Web client.

25. A system according to claim 22 wherein the means for transmitting the user request for the Web page to the Web server comprises means for transmitting the obtained user location information to the Web server in a HyperText Transfer Protocol (HTTP) header.

26. A system according to claim 22 further comprising means for validating content within the displayed object based on time of day.

27. A computer program product for selecting an object to be displayed within a Web page requested by a user from a Web server, wherein the user makes the Web page request via a mobile Web client in communication with the Web server, the computer program product comprising a computer usable storage medium having computer readable program code means embodied in the medium, the computer readable program code means comprising:

computer readable program code means for obtaining user location information in response to a user request for a Web page to be displayed via a mobile Web client, wherein the user location information is obtained by the mobile Web client;

computer readable program code means for transmitting the user request for the Web page to the Web server, wherein the Web page request contains the user location information;

computer readable program code means for receiving the user request for the Web page at the Web server along with the obtained user location information that is contained within the Web page request;

computer readable program code means for selecting an object to include within the requested Web page based on the obtained user location information contained within the Web page request;

computer readable program code means for generating the requested Web page, wherein the generated Web page includes the selected object; and computer readable program code means for serving the generated Web page to the mobile Web client.

28. A computer program product according to claim 27 wherein the computer readable program code means for obtaining user location information comprises computer readable program code means for obtaining user location information from a Global Positioning System (GPS) in communication with the mobile Web client.

29. A computer program product according to claim 27 wherein the computer readable program code means for obtaining user location information comprises computer readable program code means for obtaining user location information from a telephone number associated with the mobile Web client.

30. A computer program product according to claim 27 further comprising computer readable program code means for selecting an object to include within the requested Web page based on a time of day that the Web page request is received by the Web server.

31. A computer program product according to claim 27 wherein the computer readable program code means for transmitting the user request for the Web page to the Web server comprises computer readable program code means for transmitting the obtained user location information to the Web server in a HyperText Transfer Protocol (HTTP) header.

32. A computer program product according to claim 27 wherein the computer readable program code means for selecting an object to include within the requested Web page comprises computer readable program code means for selecting an object from a plurality of objects wherein each respective object has user location information associated therewith.

33. A computer program product according to claim 30 wherein the computer readable program code means for selecting an object to include within the requested Web page comprises computer readable program code means for selecting an object from a plurality of objects wherein each respective object has time of day information associated therewith.

34. A computer program product according to claim 27 further comprising computer readable program code means for validating content within the displayed object based on time of day.

35. A computer program product according to claim 27, wherein the computer readable program code for selecting an object comprises computer readable program code means for selecting, from a plurality of objects having respective location and time of day information associated therewith, an object having location and time of day information matching the obtained user location information and time of day that the Web page request is received by the Web server.

36. A computer program product according to claim 35 wherein the computer readable program code means for obtaining user location information comprises computer readable program code means for obtaining user location information from a GPS in communication with the mobile Web client.

37. A computer program product according to claim 35 wherein the computer readable program code means for obtaining user location information comprises computer readable program code means for obtaining user location information from a telephone number associated with the mobile Web client.

38. A computer program product according to claim 35 wherein the computer readable program code means for transmitting the user request for the Web page to the Web server comprises computer readable program code means for transmitting the obtained user location information to the Web server in a HyperText Transfer Protocol (HTTP) header.

39. A computer program product according to claim 35 further comprising computer readable program code means for validating content within the displayed object based on time of day.

* * * * *